United States Patent [19]

Ichinose et al.

[11] 3,943,461
[45] Mar. 9, 1976

[54] HIGH POWER MULTIBEAM LASER

[75] Inventors: Akira Ichinose; Norio Karube, both of Kadoma, Japan

[73] Assignee: Matsushita Electric Industrial Company, Limited, Japan

[22] Filed: Sept. 13, 1974

[21] Appl. No.: 505,574

Related U.S. Application Data

[63] Continuation-in-part of Ser. No. 376,825, July 5, 1973.

[30] Foreign Application Priority Data

July 5, 1972 Japan.............................. 47-67729

[52] U.S. Cl.............................. 331/94.5 C; 350/292
[51] Int. Cl.² ......................................... H01S 3/086
[58] Field of Search ............ 331/94.5; 350/292, 299

[56] References Cited
UNITED STATES PATENTS
3,404,349  10/1968  Rigrod ........................... 331/94.5 C

*Primary Examiner*—William L. Sikes
*Attorney, Agent, or Firm*—Robert E. Burns; Emmanuel J. Lobato; Bruce L. Adams

[57] ABSTRACT

A high power multibeam laser has an improved output coupling mirror comprised of a plurality of mirror elements attached to an adjustable mirror-supporting member. The inner face of the output coupling mirror lies in a single plane which is perpendicular to the optical axis of the laser device and the outer face of the output coupling mirror has a convex curvature.

5 Claims, 5 Drawing Figures

HIGH POWER MULTIBEAM LASER

This is a continuation-in-part of application Ser. No. 376,825 filed July 5, 1973.

This invention relates to high power lasers and more particularly to compact and small-sized lasers producing high output power in multibeams.

It is now well known that the coherent electromagnetic waves at optical frequencies having high energy density, which have been made feasible with the advent of high power lasers, has opened the door to such applications as thermonuclear fusion, various material working techniques, etc. The invention of the high power molecular gaseous laser was a milestone in this field. So far, emphasis has been placed upon the methods to increase the output power of this laser to the level where some of these applications have become possible at least in laboratories. The typical principles employed are, in the order of development, the lengthening of oscillator tubes, the convection cooling of medium gases and the chemical reaction of gases with and without triggering by electrical discharge. These methods, however, still possess certain inherent disadvantages which must be overcome before industrial applications are realized.

The laser with lengthened oscillator tube, which was the first version of all lasers to produce CW output power of killowatts order, utilizes the simple fact that the output power from a laser is proportional to the length of the oscillator tube, but failed to come into industrial applications because of the excessive length of the resulting apparatus. The convection-cooled laser, on the other hand, depends upon the physical principle that both output power and efficiency in molecular gaseous lasers increases upon cooling the medium gas due to the removal of the degradation of the population inversion which is inevitably caused when pump energy is introduced to produce CW kilowatts power at so short an active length as one meter, other problems still remain to be solved prior to industrial applications. First, being equipped with such components as large-scale gas circulator, heat exchanger etc., the overall apparatus becomes highly expensive in cost, heavy in weight and delicate in handling. Second, the optimum pressure of the medium gas is too high to sustain stable and uniform glow discharge unless some contrivance is devised. The chemical laser, which dispenses with electrical pumping power, possesses an overwhelming disadvantage for industrial applications, namely, extremely low overall efficiency. Merely increasing the mode volume by increasing the cavity diameter in conventional lasers or placing a plural number of oscillator tubes as being parallel to each other might seem to be simple substitutes for power enhancement. These schemes, however, are inadequate to produce high output power in an appropriate form for applications for various reasons already familiar to those skilled in the art. Thus it becomes necessary to devise a contrivance, which is the general purpose of this invention, to provide high power lasers which embrace many of the advantages of the aforedescribed versions and which possess none of the disadvantages.

It is an object of this invention to provide coherent electromagnetic waves at optical frequencies having high energy density from compact and small-sized, inexpensive and highly mobile lasers.

It is another object to provide the said electromagnetic waves without involving highly delicate operational procedures.

It is a further object to provide high power lasers which dispense with additional optical systems for focussing.

It is a still further object to provide high power lasers which are free from the occurrence of various high power internal damages.

The above and other objects of this invention, its features and its mode of operation will be apparent to those skilled in the art from a reading of the following specification and claims in conjunction with the accompanying drawings which show, for illustrative purposes, only preferred forms of the invention and in which:

Figure 1:
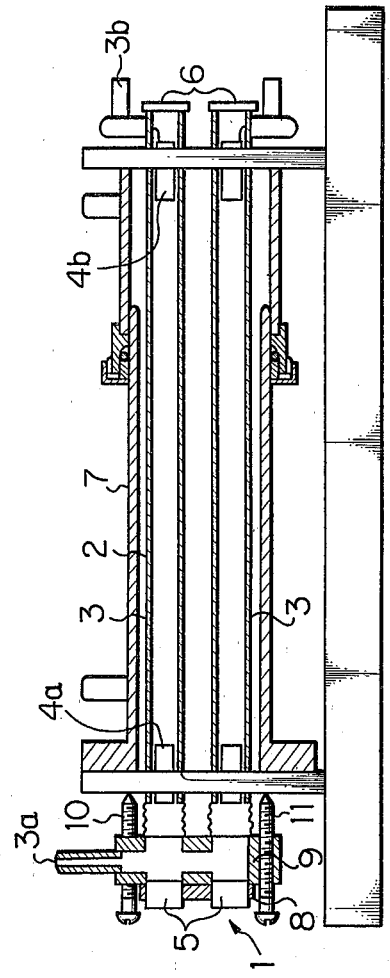
FIG. 1 is a longitudinal cross sectional view of a high power multibeam laser in accordance with the present invention.

Referring first to FIG. 1, a high power multibeam gaseous laser 1 is shown having four laser oscillator tubes 2, each having a gaseous discharge tube 3, a gas inlet 3a, a gas outlet 3b, cylindrical electrodes 4a and 4b which are mounted in close contact with the inner surface of the discharge tube 3 and located near both ends thereof, an output coupling mirror 5 positioned near one end of the tube 3 and a totally reflecting mirror 6 mounted onto the other end of it. The discharge tubes 3, which are made of insulators such as glass, quartz, ceramics etc., are mounted parallel to each other at the accuracy determined by that introduced during boring of the supporting plates. The electrodes 4a and 4b are made of proper material such as nickel, tungsten etc. The totally reflecting mirrors 6, which are composed of glass, metal or semiconductor substrate and metal or dielectric multilayer coating evaporated onto the surfaces thereof having high reflectance in the spectral region at which the laser oscillation takes place, are so mounted with sealant onto the ends of the discharge tubes 3 as being perpendicular to the axes thereof.

The output coupling mirror 5 has a mirror supporting plate 8, which is described below in more detail, segmented mirror elements 5 having the property of transparency at the oscillation wavelength, which are mounted with adhesive into the holes cut in the mirror supporting plate 8 at the locations corresponding to each discharge tube 3 and which are so ground and polished on both surfaces thereof that all surfaces thereof constitute the two common flat planes, dielectric multilayer coating evaporated onto the inner surfaces of the mirror elements 5 possessing partial transmission suitable to laser oscillation and a dielectric multilayer antireflection coating evaporated onto the outer surfaces thereof. The outer tubing 7 is the common housing of cooling liquid for all the discharge tubes 3. This design comes from the special consideration to decrease the size of the apparatus and can be replaced by the conventional water jackets attached to individual discharge tubes.

The mirror supporting plate 8 is made of suitable air-tight materials such as metal, glass and ceramics and serves to hold the segmented mirror elements 5. The mirror reinforcing body 9, which is made of metal or ceramics, serves to prevent the distortion which might arise in the mirror supporting plate 8 due to the difference between inner and outer pressures and which might cause loss of parallelism among individual output beams. It also serves to align the output coupling mirror 5 by adjustment of the bellows 10 and screws 11. The output coupling mirror 5 is adjusted after the onset of the laser oscillation by means of the screws 11 for obtaining the highest output power. The gas inlet 3a is an integral part of the mirror reinforcing body 9. The electrodes 4a are in electrical contact with this body, which simplifies the electrical power supply thereto.

Figure 2:
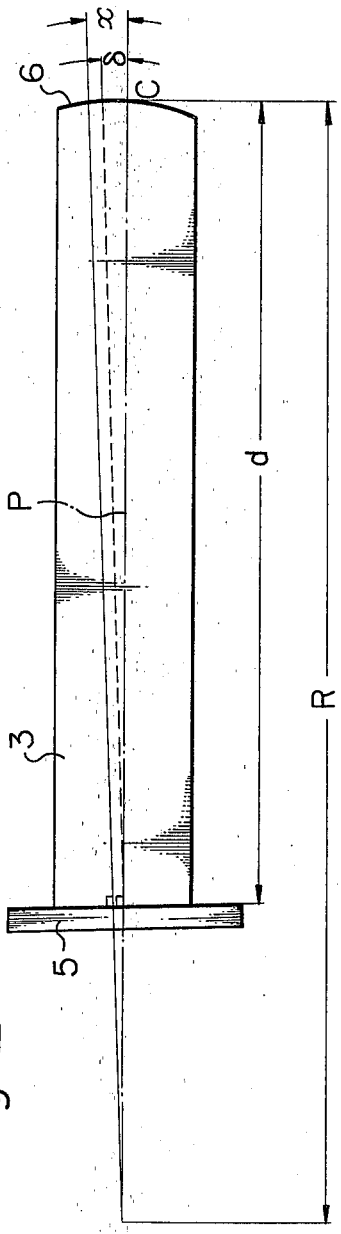
FIG. 2 is a diagrammatic representation of the operation of a high power multibeam laser in accordance with the present invention.

Referring now to FIG. 2, the basic principle of the operation of this invention is described wherein special explanation is given as to how the loss of parallelism and power of the output beams is suppressed in this invention even in the case where the strict parallelism among the discharge tubes is not maintained. The numbers designated here for each element correspond to those of FIG. 1. Further, let the deviation of a discharge tube from its correct position which is shown by the reference line P at the end be designated by $\delta$mm, the radius of curvature of a totally reflecting mirror 6 by R, the center of it by C and finally the distance between the totally reflecting mirror 6 and an output coupling mirror 5 by $d$, then it is easily shown that the laser oscillation takes place strictly perpendicular to the plane output coupling mirror 5, neglecting the diffraction of the beam, off the center of the totally reflecting mirror 6 by the distance $X=R\delta/d$ irrespective of the orientation of the discharge tube. Therefore, due to the fact that a single plane mirror is used in the laser shown in FIG. 1 commonly to all discharge tubes, the output beam from each discharge tube becomes strictly parallel to each other even in the case special alignment procedures are not taken for individual tubes. This fact that the multibeams possess strict mutual parallelism constitutes the essential part of this invention, because only such beams can be focussed into a diffraction-limited spot by means of aberration-free optical systems such as parabolic reflector, Cassegrain etc., resulting in extremely high energy density. The distance X is calculated to be 0.2 mm assuming the ordinary case consisting of $\delta=0.1$ mm, $R=2$ M and $d=1$ M, which shows that the output power of each beam is decreased to a negligible order.

Figure 3:
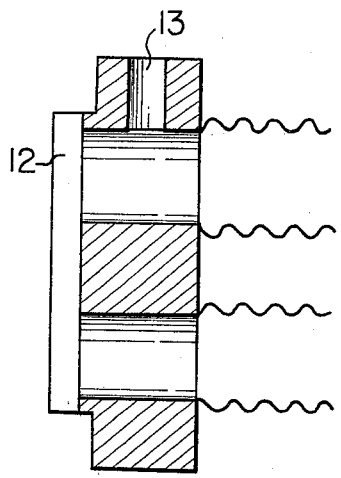
FIG. 3 is a side elevational view of an output coupling mirror mounted onto the surface of a mirror reinforcing body in accordance with the present invention.

Referring now to FIG. 3, a modification of this invention is shown in which an output coupling mirror consisting of a single mirror element 12 is used instead of the composite one shown in FIG. 1 in combination with the mirror reinforcing body 13. A distinct improvement is obtained in this modification both in the accuracy of beam parallelism and the cooling efficiency of the mirror.

Figure 4:
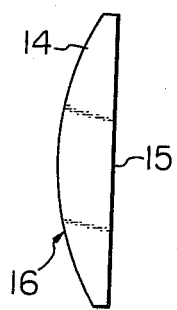
FIG. 4 is a side elevational view of an output coupling mirror forming one embodiment of the invention.

Referring now to FIG. 4, another modification of this invention is shown in which the inner surface 15 of the output coupling mirror 14 is so ground and polished as being flat while the outer one 16 is convex or hyperbolic dispensing with additional focussing optical systems.

Figure 5:
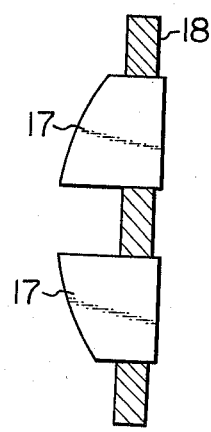
FIG. 5 is a side elevational view of one modification of the embodiment shown in FIG. 4.

Referring finally to FIG. 5, a further modification of this invention is shown in which the output coupling mirror is composed of segmented mirror elements 17 mounted with adhesive into the holes cut in the mirror supporting plate 18 as in the case of the aforedescribed composite output coupling mirror 5 shown in FIG. 1. This output coupling mirror also dispenses, as the one shown in FIG. 4, with additional focussing optical systems.

Summarizing, this invention offers as has been described in detail a useful and convenient method to obtain laser multibeams with diffraction-limited divergence which are strictly parallel to each other and which can be concentrated by means of aberration-free optical systems to a diffraction-limited spot with the resulting high energy density therein.

Further the output coupling mirror can act itself as an optical system for focussing the output beams by constituting the inner surface their of plane and the outer one convex or hyperbolic.

It should also be noted that the technique described in this invention is applicable to all kinds of lasers such as gaseous lasers, solid state lasers, dye lasers etc. as an extremely useful method to attain high energy density from a compact and small-sized apparatus.

Other similar arrangements and modifications can be derived by one skilled in the art without departing from the spirit and scope of this invention. For instance, it is possible to fix with adhesive the output coupling mirror directly to the ends of oscillation tubes in alignment with the axes thereof. In this case the occurrence of misalignment is prevented and the maintenance procedure becomes completely alignment-free. It is further possible to use a common totally reflecting mirror instead of a plural number of mirrors for individual tubes with considerable reduction in the manufacturing processes. An external mirror cavity instead of an internal mirror one can also be employed in this multibeam laser with slight modifications from the aforedescribed embodiments and with essentially the same effect in functions.

While the invention has been described in detail for the preferred forms shown, it will be understood that further modifications may be made within the scope of the invention as defined in the appended claims.

What is claimed is:

1. In a high power multibeam laser system including a plurality of oscillator tubes containing laser medium therein and positioned approximately parallel to one another, an output coupling mirror, and means for applying pump energy to said laser medium for establishing a population inversion therein, said multibeam laser system characterized in that said output coupling mirror is composed of segmented mirror elements with at least the inner surfaces thereof aligned in a single flat plane and in that the outer surface of said output coupling mirror has a convex configuration.

2. A high power multibeam laser system according to claim 1, in which the outer surface of said output coupling mirror has a hyperbolic convex configuration.

3. A high power multibeam laser system according to claim 1, including a mirror-supporting member having holes therein in which are mounted said segmented mirror elements.

4. A high power multibeam laser system according to claim 3, including means for adjusting the position of said mirror-supporting member relative to said oscillator tubes to thereby effect adjustment of the inner faces of said segmented mirror elements.

5. A high power multibeam laser system according to claim 4, wherein said means for adjusting includes adjustable bellows interposed between said mirror-supporting member and said oscillator tubes.

* * * * *